May 14, 1946.     M. M. REECE     2,400,166
NUT LOCK
Filed May 1, 1943
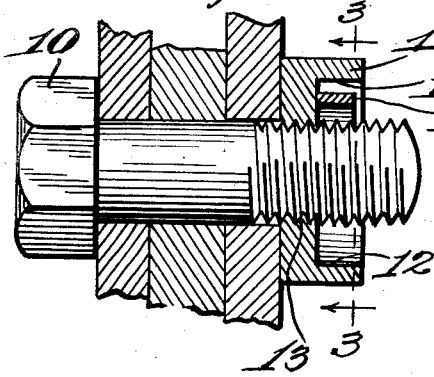
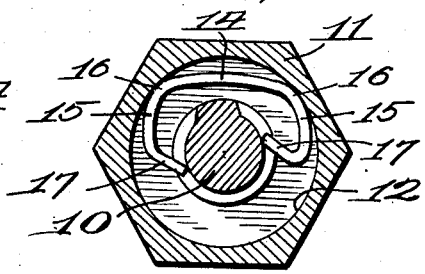
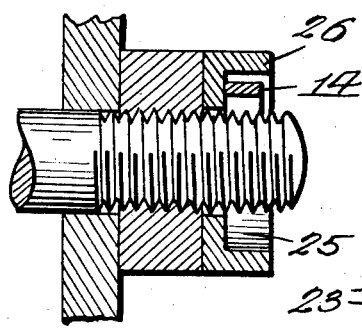
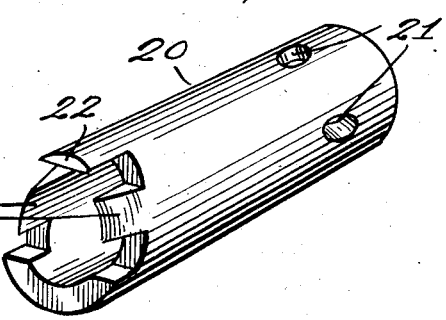
INVENTOR.
MOODY M. REECE.
BY Martin P. Smith
ATTY.

Patented May 14, 1946

2,400,166

UNITED STATES PATENT OFFICE 2,400,166

NUT LOCK

Moody M. Reece, Los Angeles, Calif.

Application May 1, 1943, Serial No. 485,309

2 Claims. (Cl. 151—25)

My invention relates to a new and useful nut lock and has for its principal objects, to provide simple and efficient means for positively locking a nut to a bolt in any adjusted position, and further, to provide a nut lock which is inexpensive to manufacture and capable of being easily applied to or removed from the nut and bolt without damage thereto.

A further object of my invention is to provide a nut lock comprising a bow-shaped resilient body having both end portions formed and shaped so as to engage the threads on the bolt at diametrically opposite points and thereby co-operate in maintaining the nut and bolt in their assembled relation.

With the foregoing and other objects in view, my invention consists in certain novel features of construction and arrangement of parts which will be hereinafter more fully described and claimed and illustrated in the accompanying drawing in which:

Fig. 1 is a perspective view of my improved nut lock.

Fig. 2 is a sectional view showing the nut lock applied for use on a nut and bolt.

Fig. 3 is a sectional view taken on the line 3—3 of Fig. 2.

Fig. 4 is a sectional view similar to Fig. 2 and showing the nut lock associated with a washer so as to convert same into a lock washer.

Fig. 5 is a perspective view of a wrench utilized for applying the lock to and releasing same from a nut.

Referring by numerals to the accompanying drawing which illustrates a preferred embodiment of my invention, 10 designates a conventional bolt, 11 the nut therefor and where my improved lock is associated with the nut, the same is provided with a circular recess 12 concentrically disposed about the threaded bolt-receiving aperture 13.

The locking member, in accordance with my invention, is formed from a strap-like piece of resilient metal, preferably steel, with the central portion 14 slightly bowed and from the ends of said central portion, the metal is bent substantially at right angles in the same direction to form arms 15 which are slightly bowed lengthwise.

The bending of the arms 15 away from the central portion 14 of the locking element provides between said portions, externally disposed shoulders 16.

From the ends of the arms 15 the metal in the strap is bent inwardly with the ends extending toward each other to form short fingers 17 which occupy angular positions with respect to the arms 15 and positions substantially parallel with each other.

The ends of the fingers are serrated as designated by 18 for engagement with the threads of the bolt to which the nut lock is applied. Thus, when the lock is applied for use, the fingers 17 are positioned on opposite sides of the bolt, substantially tangent to the periphery thereof and with the teeth on the ends of said fingers in engagement with the threads of said bolt (see Fig. 3).

Normally, or before the lock is inserted in the recess 12 in nut 11, the distance between the serrated ends of fingers 17 is slightly less than the diameter of the threaded portion of the bolt and thus when the lock is applied for use, the fingers are flexed away from each other, thus setting up strains which tend to move the ends of said fingers toward each other into frictional engagement with the bolt threads.

When the lock is applied for use, the fingers 17 are disposed so that they do not materially resist the screwing of the nut onto the bolt, but they do resist and counteract any tendency of the nut to unscrew.

In Fig. 5 I have illustrated a wrench or tool for manipulating the lock when same is applied to or removed from a nut or washer. This wrench consists of a tubular body 20 provided in its rear with apertures 21 for the reception of a rod which serves as a handle for rotating the tool and formed on the opposite end of said body is a finger 22 which projects outwardly from the periphery of said body and to the sides of said finger are lugs 23 having bevelled outer faces.

When the tool is applied to the lock, finger 22 overlies the central portion 14 of the lock and the bevelled lugs 23 engage beneath the arms 15 of the lock and flex same outwardly so as to disengage the ends of fingers 17 from the thread on the bolt.

In applying my improved lock to a nut after the same has been tightened on the bolt, the lock, carried on the end of the tool is forced into recess 12 during which action the bevelled faces of lugs 23 will flex arms 15 outwardly a sufficient distance to enable the ends of fingers 17 to pass over the bolt threads. Upon withdrawal of the tool, the arms and fingers of the lock will move toward the bolt so that the serrated ends of said fingers will engage the threads thereof and thus the nut will be effectively held against becoming unscrewed from said bolt.

When the lock is applied to the nut before same is tightened on the bolt, said nut is first tightened by means of a wrench and the tool 20 is now applied to the lock to rotate same about the bolt, until the inner edge of the lock is tightly engaged against the nut.

The lock may be screwed onto the bolt, but, due to the engagement of the teeth on the ends of fingers 17 with the bolt threads, it cannot be unscrewed, such results being due to the tangential positions of the fingers 15 relative to the periphery of the bolt and the engagement of the serrated ends of said fingers with the bolt threads at diametrically opposite points on said bolt.

In Fig. 4 I have shown the lock positioned in the recess 25 of a washer 26, which is positioned on the bolt against the nut thereon and thus, an effective lock washer is provided to prevent unscrewing of the nut.

Thus it will be seen that I have provided a nut lock which is simple in construction, inexpensive of manufacture and very effective in performing the functions for which it is intended.

It will be understood that minor changes in the size, form and construction of the nut lock may be made and substituted for those herein shown and described without departing from the spirit of the invention, the scope of which is set forth in the appended claims.

I claim as my invention:

1. A resilient flat spring member adapted for use as a thread engaging member for a nut lock, having a bow-shaped intermediate portion, a short arm projecting substantially at right angles from each end of said bow shaped portion, sharply curved bends forming the connections between the ends of said bow shaped portion and said arms, a short finger projecting inwardly from the end of each arm and substantially parallel with each other, one of which fingers projects toward the bow-shaped intermediate portion of said member, the other finger projecting away from said member and the ends of said fingers being serrated for engagement with the thread of the bolt to which the nut carrying the spring member is applied.

2. The combination with a nut provided with a threaded bolt receiving aperture and a recess surrounding said aperture, of a flat spring member adapted to occupy said recess and lock said nut to the bolt on which it is mounted, said member having a bow shaped intermediate portion, a short arm projecting substantially at right angles from the end of each arm, sharply curved bends forming connections between the ends of said bow portion and said arms, which bends are adapted to bear against the side face of the recess in the nut, a finger projecting inwardly from the end of each arm and in substantially parallel relation with each other the end of each finger being serrated for engagement with the threads of the bolt to which the nut carrying the spring member is applied.

MOODY M. REECE.